United States Patent [19]

Balatoni

[11] Patent Number: 5,610,922
[45] Date of Patent: Mar. 11, 1997

[54] VOICE PLUS 4-WIRE DDS MULTIPLEXER

[75] Inventor: Nicholas A. Balatoni, Santa Clara, Calif.

[73] Assignee: Raychem Corporation, Menlo Park, Calif.

[21] Appl. No.: 408,610

[22] Filed: Mar. 20, 1995

[51] Int. Cl.$^6$ ........................................... H04J 3/12
[52] U.S. Cl. ........................... 370/468; 370/524; 370/535; 379/410
[58] Field of Search .................... 370/110.1, 112, 370/78, 108, 84, 68, 58.1; 379/410, 399, 406

[56] References Cited

U.S. PATENT DOCUMENTS

| | | | |
|---|---|---|---|
| 3,660,606 | 5/1972 | DeWitt | 179/15 BA |
| 3,711,650 | 1/1973 | Kuhn et al. | 179/15 BW |
| 3,851,106 | 11/1974 | Jacobaeus | 179/15 AP |
| 3,922,493 | 11/1975 | Brenig et al. | 179/15 AP |
| 3,936,602 | 2/1976 | Korver | 370/108 |
| 4,112,427 | 9/1978 | Hofer et al. | 340/347 C |
| 4,145,574 | 3/1979 | Wintzer | 179/15 A |
| 4,381,427 | 4/1983 | Cheal et al. | 179/2 DP |
| 4,417,333 | 11/1983 | Cochennec | 370/66 |
| 4,519,073 | 5/1985 | Bertocci et al. | 370/118 |
| 4,578,538 | 3/1986 | Pascucci et al. | 370/78 |
| 4,642,805 | 2/1987 | Dumas et al. | 370/110.1 |
| 4,644,527 | 2/1987 | Anderson et al. | 370/58 |
| 4,724,417 | 2/1988 | Au et al. | 338/22 R |
| 4,740,963 | 4/1988 | Eckley | 370/110.1 |
| 4,751,696 | 6/1988 | Black | 370/58 |
| 4,755,994 | 7/1988 | Staples et al. | 370/118 |
| 4,788,680 | 11/1988 | Kikuchi et al. | 370/68 |
| 4,901,344 | 2/1990 | Monette et al. | 370/110.1 |
| 4,924,492 | 5/1990 | Gitlin et al. | 379/93 |
| 4,993,063 | 2/1991 | Kike | 379/405 |
| 5,303,267 | 4/1994 | Gupta | 370/112 |
| 5,453,989 | 9/1995 | Kitayama et al. | 370/110.1 |
| 5,459,729 | 10/1995 | Bliven | 370/112 |

FOREIGN PATENT DOCUMENTS

| | | | |
|---|---|---|---|
| 0251986A2 | 1/1988 | European Pat. Off. | H04Q 5/02 |
| WO85/04298 | 9/1985 | WIPO | H04J 1/05 |

OTHER PUBLICATIONS

Advertising materials for Pairspan™–2 Two–Line Digital Carrier System, Optilink Corporation, May 1989.
Optilink Corporation, Pairspan™–2 Digital Subsciber Carrier System Product Line Description (Jul. 20, 1989).
Bellamy, John, Digital Telephony, John Wiley & Sons (1982).
Siemens, Telecommunications Data Book (1987).
Kawakami, Masachika, Toshiyuki Ishikawa and Hitoshi Hiraike, Improved Subsciber Loop Multiplexing Systems for Rural Use, Japan Telecommunications Review (Apr. 1978).
Kaiser, W. A. and H. T. Hagmeyer, Digital Two–Wire Local Connection Providing Office Subscribers with Speech, Data and New Teleinformation Services (Mar. 20–24, 1978).
Pacific Bell, Request for Quote, Digital Added Main Line (Jun. 14, 1989).

(List continued on next page.)

*Primary Examiner*—Wellington Chin
*Assistant Examiner*—Melissa Kay Carman
*Attorney, Agent, or Firm*—Herbert G. Burkard; Bruce M. Bertram; Townsend & Townsend & Crew

[57] ABSTRACT

A method and apparatus 200 for transferring analog voice telephone signals and digital data service signals simultaneously from a telephone company location to a customer premises over a single twisted pair telephone line 205. The present apparatus 200 includes an easily installed voice plus digital data service remote terminal 203 and voice plus digital data service central office terminal 201. The present apparatus can provide a 3-to-1 pair gain by multiplexing signals representing the analog voice telephone signals and 4-wire digital data service signals.

21 Claims, 4 Drawing Sheets

Microfiche Appendix Included
(4 Microfiche, 315 Pages)

OTHER PUBLICATIONS

Bell Atlantic Network Services, Inc., Request for Quotation RFQ# 90BGP0018,.

Eastern Communications Forum 88 (May 2–4, 1988).

Rockwell International, Dualline Plus Data Sheet (1990).

Advertising materials for "DigiLoop", ECI Telecom, (Undated, however, received after filing of application 07/385,610, Jul. 25, 1989).

Advertising materials for "DAML–100", Whelock, Inc. (Undated, however, received after filing of application 07/385,610, Jul. 25, 1989).

Advertising materials for Pairgain 2, Digital Pair Saver, Pairgain Technologies (Undated, however, received after filing of application 07/385,610, Jul. 25, 1989).

Siemens, ISDN Communications Controller ICC PEB 2070 Data Sheet Rev. 3.0, (Jul. 1988).

American National Standard for Telecommunications, ANSI T1.601–1988, Integarted Services Digital Network (ISDN) Basic Access Interface for Use on Metallic Loops for Application on the Network Side of the NT (Layer 1 Specification)(Sep. 16, 1988).

Pacific Bell/Nevada Bell Requirements and Objectives for Digital Added Main Line, Pub L–780057–PB/NB, Issue 1 (May 1989).

Letter from David Bliven to Nynex Material Enterprises (Jan. 23, 1989)(with Request for Proposal(next entry)).

New York Telephone Marketing & Technology, Request for Proposal RFP First Generation Universal Digital Channel System (FGUDC)(Dec. 1988).

VOICE PLUS 4-WIRE DDS MULTIPLEXER

CROSS-REFERENCES

This application is related to PCT International Publication Number WO 91/01600, published Feb. 7, 1991, and to U.S. Pat. No. 5,111,497 issued on May 5, 1992 to Bliven et al., both of which are completely incorporated by reference for all purposes. This application is also related to application Ser. No. 08/408,585 and to application Ser. No. 08/408,020 both filed on the same day as the present application.

Appendices I–VI have been provided on microfiche.

COPYRIGHT NOTICE

A portion of the disclosure of this patent document contains material which is subject to copyright protection. The copyright owner has no objections to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to the field of data communications. Merely by way of example, the present invention is illustrated as a method and apparatus for transmitting a voice channel and a digital a 4-wire digital data service (DDS) signal over a single twisted pair telephone line.

Techniques for the transmission of multiple voice or data signals are well known in the telecommunications industry. Conventional digital data services (DDSs) over a 4-wire local loop include digital services at transmission rates of 2.4 kilo-bits/sec. (kbps), 4.8 kbps, 9.6 kbps, 19.2 kbps, and 56 kbps. Business subscribers often desire the use of such conventional DDSs for electronic data processing equipment such as telephones, computers, facsimile machines, and the like. However, it often is difficult, costly, and time consuming to add a 4-wire local loop onto a customer premises, thereby making it difficult to the obtain DDS.

For example, the conventional DDS needs to transmit digital data over "clean" telephone lines, that is, telephone lines that substantially have no abrupt changes in impedance values from wire gauge changes, bridge taps, coils, and the like. In particular, telephone companies often find it necessary to condition pre-existing telephone lines to remove such wire gauge changes, bridge taps, coils, and the like before implementing the conventional DDS onto the pre-existing telephone lines. In fact, telephone companies refer to this type of conditioning as a class C3 data conditioning technique. The C3 data conditioning technique often takes up to two weeks or even more for a typical 10–12 kilo-feet 4-wire local loop.

Another limitation with the use of the conventional 4-wire DDS is the need for repeaters. Some telephone companies even install a repeater at customer premises if line losses cause the signal level to fall below a pre-determined level such as 32 dBs using 28 kHz, 48 kHz, and 80 kHz test signals. The use of the repeater at the customer premises often occurs because certain data service unit/channel service units (DSU/CSU) operate ineffectively at low signal levels. The conventional DDS also relies upon a typical bipolar signal at a transmission rate of up to 56 kbps which often cannot flow effectively over a line span of 10–12 kilo-feet without the use of a repeater. The use of such repeater increases the cost of the conventional DDS for transmission lengths greater than 10–12 kilo-feet, and also decreases the efficiency and reliability of the conventional DDS by introducing additional elements into the telephone line span.

Still further, the convention 4-wire DDS service lacks capability for analog phone services. In particular, the 4-wire DDS service provides digital services at the aforementioned transmission rates which cannot easily convert to a plain analog phone signal representing plain old telephone services (POTS). It is often desired to have POTS at a customer premises as a "back-up" service when the conventional 4-wire DDS service fails. In addition, the conventional 4-wire DDS relies upon the use of copper from 4-wires, which is a limited telephone company resource.

From the above, it is seen that a method and apparatus for providing an increase in telephone services from a telephone company central office to a customer premises over pre-existing wires is often desired.

SUMMARY OF THE INVENTION

According to the present invention, a method and apparatus is provided to convert a 4-wire DDS signal and signals from a voice channel into multiplexed digital signals for transmission over a single twisted pair telephone line. The present invention provides an easy to install remote terminal and central office terminal to convert a single twisted pair telephone line for transmission of 2B1Q signals representing a combination of the 4-wire DDS and the voice channel.

In a specific embodiment, the present invention provides a method of transferring signals from a voice channel and a digital data service channel from a telephone company location to a customer premises. The present method includes steps of providing an analog telephone signal and a 4-wire DDS signal which is a bipolar digital signal at a telephone company location. The present method also includes converting the analog telephone signal into a first binary signal and converting the 4-wire DDS signal into a second binary signal and combining the first binary signal and the second binary signal to define a higher rate binary signal. The present method further includes converting the higher rate binary signal into a digital signal in a quaternary format. A step of transferring the digital signal to a customer premises over a single twisted pair telephone line is also included.

An alternative specific embodiment provides an apparatus for transferring signals from a voice channel and a digital data service channel from a telephone company location to a customer premises. The present apparatus includes an analog telephone signal source and a 4-wire DDS signal source at a telephone company location. The present apparatus also includes a central office circuit converting the analog telephone signal into a first binary signal, converting the 4-wire DDS signal into a second binary signal, combining the first binary signal and the second binary signal to a higher rate binary signal, converting the higher rate binary signal into a digital signal format, and transferring the digital signal to a customer premises over a single twisted pair telephone line.

A further alternative specific embodiment provides a method of converting a single twisted pair line into multiplexed digital use of an analog voice channel and a 4-wire DDS channel. The present method includes installing a office terminal at a telephone company location. The present office terminal has a central office circuit adapted to convert an analog telephone signal into a first binary signal, adapted to convert a 4-wire DDS signal into a second binary signal, adapted to combine the first binary signal and the second binary signal to a higher rate binary signal, adapted to convert the higher rate binary signal into a digital signal, and adapted to transfer the digital signal to a customer premises over a single twisted pair telephone line. The present method also includes installing a remote terminal at a customer premises. The present remote terminal includes a remote terminal circuit adapted to convert the digital signal to the higher rate binary signal, adapted to separate the first binary signal and the second binary signal from the higher rate binary signal, adapted to convert the first binary signal into the analog telephone signal, and adapted to convert the second binary signal into the 4-wire DDS signal for use at the customer premises.

A further understanding of the nature and advantages of the present invention may be realized by reference to the latter portions of the specification and attached drawings.

DESCRIPTION OF THE SPECIFIC EMBODIMENT

Conventional 4-wire DDS

Figure 1:
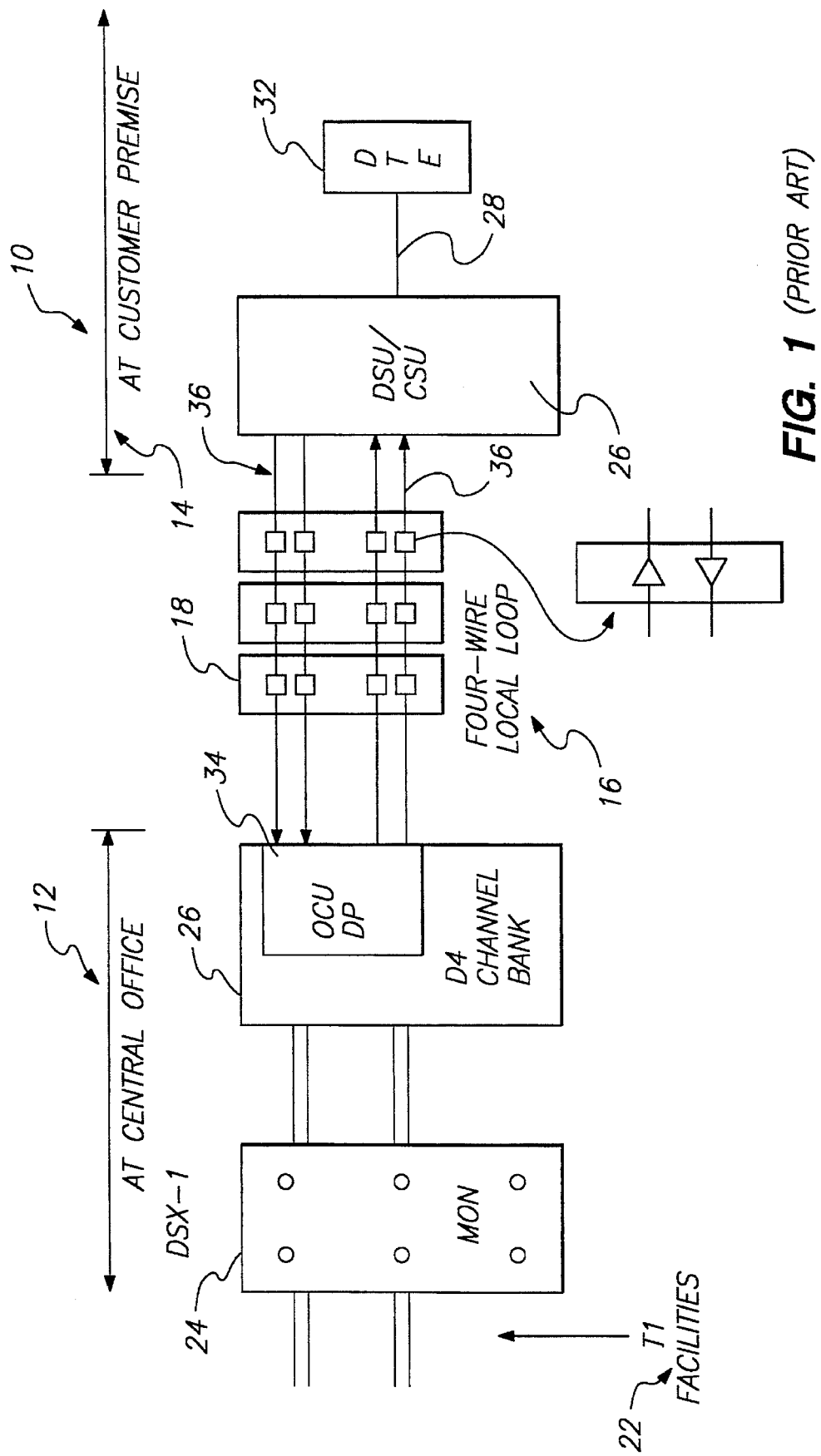
FIG. 1 is a simplified block diagram for a conventional 4-wire DDS.

FIG. 1 is a block diagram for a conventional 4-wire DDS circuit 10 deployed over a local loop between a central office 12 and a customer premises 14. Between the central office 12 and the customer premises 14 is a 4-wire local loop 16, typically with repeaters 18 based upon the loop length. At the central office 12, the conventional 4-wire DDS is coupled to T1 facilities 22, and includes a digital switch (or cross-connect) 24, and a channel bank 26. The customer premises includes system elements such as a data service unit/channel service unit (DSU/CSU) 26, a line interface 28, and a data terminal equipment (DTE) 32.

The central office receives the T1 transmission from a T1 carrier. The T1 carrier provides a DS-1 signal using 24 DS0 signals at a combined signal rate of 1.544 Mbps. The DS0 signal is the basic data channel encoded via pulse code modulation (PCM) and corresponds to a single DS0 voice channel at a signalling rate of 64 kbps. The DS-1 signal carries 24 DS0 channels, or a resultant group of multiplexing 24-eight-bit words, one for each input to a channel bank. The resulting group of 24 PCM words is known as a frame. A single framing bit is inserted by use of time division multiplexing (TDM) to separate each frame from the next frame. The resultant frame has 193 bits and represents 24 voice digitized conversions with the one framing bit.

In North America, a conventional channel bank generally contains 24 channels, and a conventional channel bank in Europe generally contains 30 channels. The channel bank can also include a multiplicity of office channel unit/data ports (OCU/DP) 34 to provide data signals to the 4-wire local loops. A conventional channel bank can be a D4 channel bank 26.

The D4 channel bank 26 combines 12 basic frames into a super-frame. The framing bits are often altered by the transmitting multiplexer to enable the receiving multiplexer to maintain synchronization. The composition of framing bits within the superframe forms a distinct pattern. The framing sequence, in which the 12-bit frame pattern continuously repeats itself, is called D4 framing. The odd-numbered frames alternate the sequence 1010 . . . , while the even numbered frames alternate the sequence 000111 . . . Alternatively, the conventional channel bank can be a subscriber loop carrier (SLC) for 96 channels which may represent 96 telephone lines. The SLC for 96 channels is known as the SLC-96 channel bank. The SLC-96 channel bank is also compatible with DDS circuits by use of OCU/DP plug-ins.

The 4-wire local loop 16 between the OCU/DP and the CSU/DSU is defined as two twisted pairs 36, each representing two wires. The 4-wire local loop also includes repeaters 18 based upon the loop length. The repeaters are often placed onto the 4-wire local loop about every 10–12 kilo-feet of line span to regenerate the bipolar digital pulses. The number of repeaters placed on to the 4-wire local loop depends upon the total line span or length.

At the customer premises, the conventional 4-wire DDS includes the DSU/CSU 26, the line interface 28, and the data terminal equipment (DTE) 32. The DSU performs the conversion of data from a unipolar data format into a bipolar data format for transmission over the 4-wire local loop. The DSU also performs the data conversion from the bipolar data format into the unipolar data format for use at the DTE. The CSU terminates the digital circuit at the customer premises (or any end user's premises) and performs functions such as line conditioning, remote loopback testing, signal regeneration, and monitoring of the incoming digital signal to detect violations of rules governing the transmission of data on the 4-wire digital facility. The combined DSU/CSU generally converts the bipolar data format from the 4-wire local loop into a format such as RS-232C or V.35 for use at the DTE. The DSU/CSU also converts the signal from the DTE into the bipolar data format for use on the 4-wire digital facility.

As previously noted, the conventional 4-wire DDS system inherently possesses a variety of limitations. The limitations include the use of four wires, the need to condition pre-existing wires before 4-wire DDS use, the use of repeaters, the inability to handle the analog voice channel, and the like.

Present Voice Plus 4-Wire DDS System

I. System Hardware

In a specific embodiment, the present voice plus 4-wire DDS delivers a 4-wire DDS circuit and a voice channel from a telephone company central office to a customer premises such as a business or the like over a single twisted pair of telephone wires. The specific embodiment provides a 3-to-1 pair gain and leads to better efficiency in the deployment of copper and the like. It should be noted that the present invention is not limited by way of the voice plus 4-wire DDS embodiments, one of ordinary skill in the art will easily recognize other practical implementations of the invention described herein. Accordingly, the claims of the present invention will not be limited to the embodiments as described herein.

Figure 2:
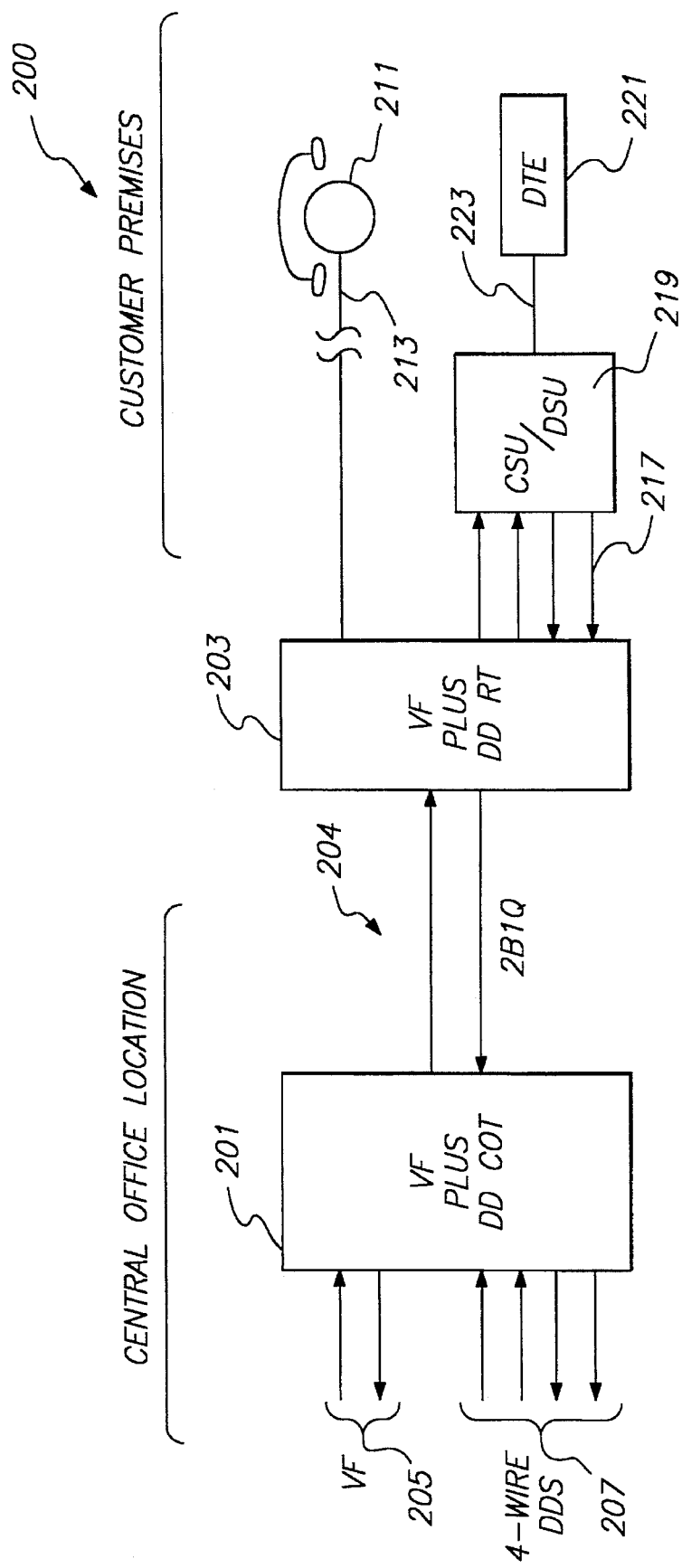
FIG. 2 is a simplified block diagram for a 4-wire DDS and a voice channel according to the present invention.

FIG. 2 is a simplified block diagram for a voice plus 4-wire DDS system 200 according to the present invention.

The voice plus 4-wire DDS system 200 includes a voice plus digital data central office terminal (VF Plus DD COT) unit 201 (e.g., line card) at a central office location and a voice plus digital data service remote terminal (VF Plus DD RT) 203 at a customer premises. VF Plus DD COT receives and transmits analog signals VF via lines 205 and 4-wire DDS signals via lines 207. VF Plus DD RT receives and transmits analog telephone signals via line 213 from and to telephone 211. VF Plus DD RT also receives and transmits data signals from data terminal equipment via a data service unit/carrier service unit (DSU/CSU) via lines 217. The DSU/CSU converts the 4-wire data signals into a signal compatible with the data terminal equipment 221. The compatible signal includes RS-232C, V.35, and others.

Between the VF Plus DD COT and the VF Plus DD RT is a digital subscriber line 204 which is the single twisted pair telephone line. The digital subscriber line transmits multiplexed digital data through the single twisted pair at 160 kbps using a 2B1Q data format, without the use of repeaters for a typical 18 kft mixed gauge line span. Alternatively, the digital data format may be 4B3T and others.

Figure 3:
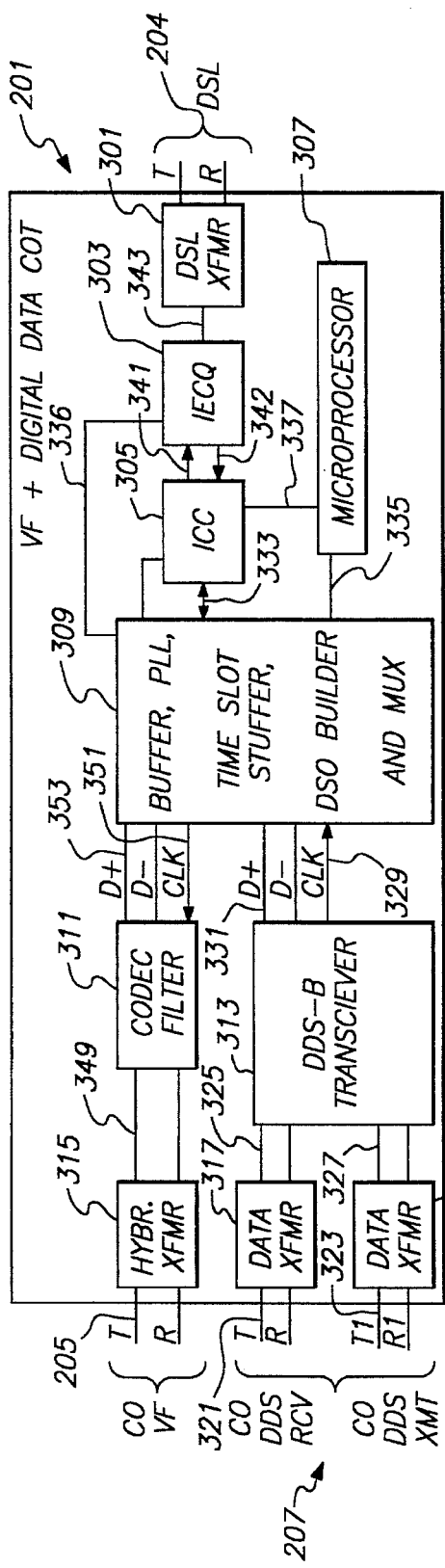
FIG. 3 is a simplified block diagram for a central office terminal according to the present invention.

FIG. 3 illustrates a simplified block diagram of a voice plus 4-wire digital data service central office terminal (VF Plus DD COT) 201 according to the present invention. The VF Plus DD COT 201 includes a digital subscriber line transformer (DSL Xfmr) 301, an ISDN echo cancellation-quaternary (IECQ) integrated circuit chip 303, an ISDN communications controller (ICC) integrated circuit chip 305, a microprocessor 307, a custom integrated circuit chip 309, a codec filter 311, a digital data service (DDS) transceiver 313, a hybrid transformer (Hybr. Xfmr) 315, data transformers (Data Xfmr(s)) 317, 319, among other elements. The VF Plus DD COT will be first described in reference to outgoing 4-wire DDS signals from a telephone company location.

Outgoing 4-wire DDS signals (CO DDS Rcv) enter the data transformer 317 via lines 321 from a channel bank in the central office. The data transformer and surrounding resistive elements (not shown) isolate, condition, and impedance match the outgoing 4-wire DDS signals for use in the DDS transceiver (DDS-B). The outgoing 4-wire DDS signals from the data transformer 317 enter DDS transceiver via lines 325.

The DDS transceiver 313 performs selected clock recovery and data formatting operations. In particular, the DDS transceiver recovers a clock (Clk) signal from the transmitted outgoing 4-wire signal from the data transformer for use by the custom integrated circuit chip 309 and other circuit elements via line 329. The clock signal is preferably a signal rate at 56 kHz from a dedicated 56 kbps DDS or a switched 56 service. The DDS transceiver also converts the 4-wire outgoing signal from the data transformer from the bipolar signal into a unipolar binary TTL signal defined by D+ and its inversion D− for use at the custom integrated circuit chip via lines 331. The D+ and the D− signals also provide certain error monitoring and correction features and the like.

Outgoing analog signals such as voice and the like exit a central office two wires plain old telephone services (POTS) interface circuit via lines 205 and enter a hybrid transformer 315. The hybrid transformer isolates, conditions, impedance matches, and separates the outgoing analog signals into send and receive direction signals for transmission to the codec filter 311 over lines 349. The hybrid transformer also converts the outgoing analog signals from a 2-wire format into a 4-wire format (as well as 2-wire format to 4-wire format as necessary).

The codec filter converts the received analog signals from the hybrid transformer 315 into a PCM encoded digital signal using a sampling rate at 8,000 times a second at 8-bits per sample. (The codec filter also converts the PCM encoded digital signal into an analog signal in the other direction.) The encoded digital signal from the codec filter exits the codec filter as unipolar TTL binary signals defined by D+ and its inversion D− via lines 353. The D+ and D− signals also provide for features such as monitoring, error correction, and the like. The codec filter receives a 64 kHz clock (Clk) signal via line 351 from the custom integrated circuit chip. Of course, the clock signal may be based upon the synchronizing clock signal captured from any clock source in the central office.

The custom integrated circuit chip 309 provides selected data handling and clocking features. The custom integrated circuit chip is typically an application specific integrated circuit (ASIC) such as an gate array, a field programmable gate array, or the like. In the specific embodiment, the custom integrated circuit is a Xilinx 3000 Series Programmable Gate Array, but can also be a variety of other integrated circuit chips. Appendix I provides a schematic representation (Copyright, Unpublished Work, Raychem Corporation) for the Xilinx 3000 Series Programmable Gate Array for the VF Plus DD COT discussed herein. However, it would be noted by one of ordinary skill in the art that other types of integrated circuit(s) and the like may also be used.

The custom integrated circuit chip uses a phase-locked loop (PLL) to synchronize the clock (Clk) from the data transceiver 313 with its internal clocks. The data transceiver clock (Clk) is a at 56 kHz signal rate. The custom integrated circuit receives the 56 kHz clock signal, divides the 56 Hz clock signal down to a 800 Hz clock signal, and increases the 800 Hz clock signal to provide other selected clock frequencies by way of a two phase PLL configuration. For example, a first PLL inputs the 800 Hz signal and outputs a 512 kHz signal, and a second PLL inputs the 512 KHz signal and outputs a 15.360 MHz signal. The 512 kHz clock enters the ICC integrated circuit chip via line 334. The 15.360 kHz clock and the 512 kHz clock enter the IECQ via line 336. The PLL configuration also provides a clock signal at a rate of 64 kHz also for use by the codec filter 311.

Besides clocking features, the custom integrated circuit chip uses the 64 kHz clock signal to build the D+ and D− signals corresponding to the signals from the codec filter and the data transceiver into two 64 kbps data signal. The two 64 kbps data signals are multiplexed together with two other 64 kbps signals corresponding to a control & information (C & I) channel, and a monitor channel. The total bit rate of the outgoing signal from the four 64 kbps signals adds to 256 kbps, a corresponding incoming signal also adds to 256 kbps, thereby requiring the use of the 512 kHz clock signal for synchronization.

Over line 333, the outgoing signal is bi-directionally "ping-ponged" at a transmission rate of 512 bkps, and enters the ICC integrated circuit chip via line 333. The outgoing signal enters the ICC integrated circuit chip arranged as 8 bits of data from one channel, 8 bits of data from another channel, 8 bits of control and information (C & I) data, and 8 bits of monitor signal data, and then repeats in the other direction, permitting substantially simultaneous transmission/reception of the digitized voice signals and data signals. The ICC converts the stream of data from the custom integrated circuit chip into two unidirectional 256 kbps binary TTL signal going to and from the IECQ. The ICC operates at a clock signal (CLK) at, for example, 512 kHz and a frame control signal (FSC) at, for example, 8 kHz. The CLK and FSC are provided from the custom integrated circuit chip via line 334. Monitor data, ring data, and other data which the microprocessor 307 polls are made available to the microprocessor via lines 337 and 335.

The IECQ converts the binary signals it receives from the ICC at 256 kbps via line 341 to an outgoing 2B1Q data signal at 160 kbps. The 2B1Q signal has two bits of information stored onto a quaternary word. The IECQ sends the outgoing data signal via line 343 into a digital subscriber line transformer 301 which conditions and impedance matches the data signals for transmission over the digital subscriber line 204. The digital subscriber line is a single twisted pair telephone wire. The span may be up to 18 kilo-feet on typically mixed 24/26 gauge twisted pair lines without the use of any repeaters or the like. At wire gauges larger than 24/26 gauge, the span may be up to 33 kilo-feet and even greater.

Incoming signals from the digital subscriber line 204 at the VF Plus DD COT 201 are processed in a similar but reverse method as the outgoing signals. In particular, a 2B1Q signal enters the DSL transformer 301 via lines 204 which isolates, conditions, and impedance matches the 160 kbps 2B1Q signal for use in the IECQ integrated circuit chip 303. The 160 kbps 2B1Q signal enters the IECQ integrated circuit chip from the DSL transformer via line 343. The IECQ integrated circuit chip 303 converts the 2B1Q signal into a binary signal at transmission rate of 256 kbps for use in the ICC integrated circuit chip via line 342. The ICC integrated circuit chip sends data in the form of four 8-bit words to the custom integrated circuit chip over line 333.

The custom integrated circuit chip then separates the four 8-bit words into signals corresponding to the 4-wire DDS signal, the analog voice signal, the C & I signal, and the monitor signal. The 4-wire DDS signal includes the D+ and D− components representing binary TTL signals transferred from the custom integrated circuit chip via lines 331 into the DDS transceiver 313. The DDS transceiver converts the binary TTL signals into the selected 4-wire DDS signal and transmits such selected 4-wire DDS signal via lines 327 to the data transformer at the desired DDS sub-rate. Incoming 4-wire DDS signals leave the data transformer via lines 323 to the channel bank. As for signal representing the analog voice signal, it enters the codec filter 311 via lines 353 as D+ and D− from the custom integrated circuit chip. The codec filter 311 converts the binary TTL data signal into an analog voice signal for transmission via lines 349 to the hybrid transformer 315. The hybrid transformer conditions the analog voice signal and transmits the conditioned analog voice signal via lines 205 to the channel bank. Appendix II provides a schematic representation of FIG. 3 (Copyright, Unpublished Work, Raychem Corporation) for the VF Plus DD COT discussed above.

Figure 4:
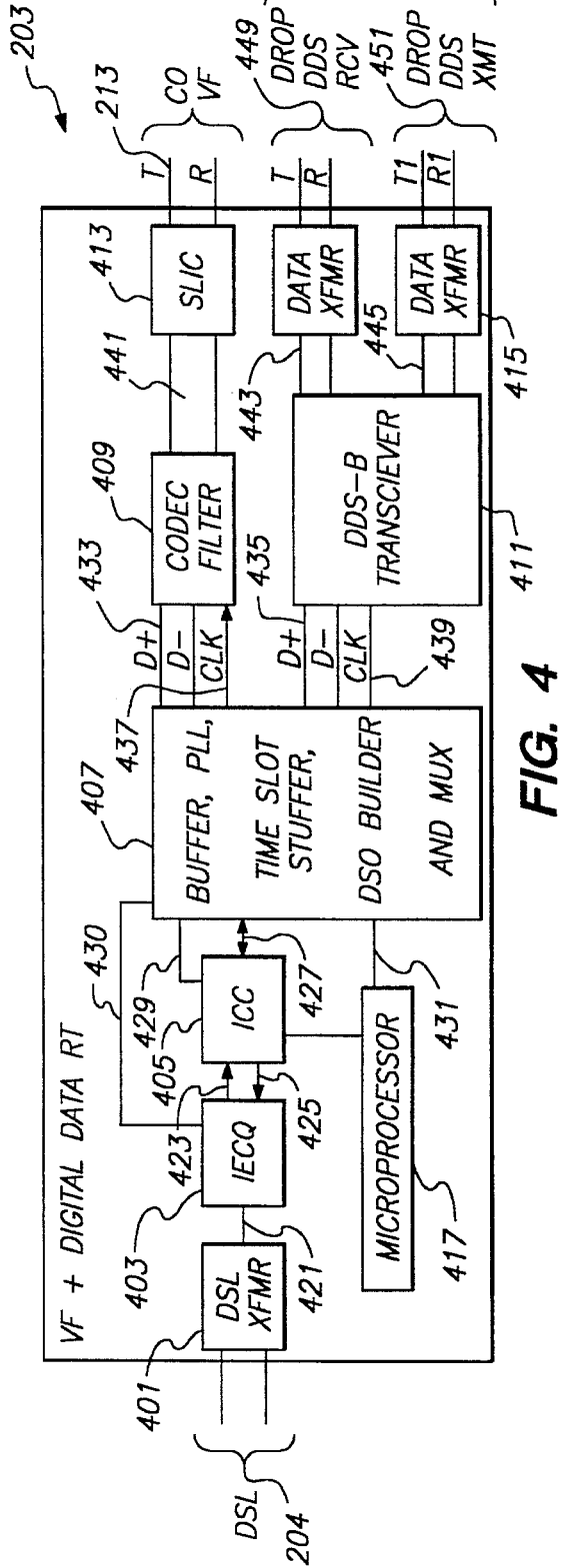
FIG. 4 is a simplified block diagram for a remote terminal according to the present invention.

FIG. 4 illustrates a simplified diagram of a voice plus 4-wire DDS RT (VF Plus DD RT) 203 according to the present invention. The VF Plus DD RT 203 includes system elements such as a digital subscriber line transformer (DSL Xfmr) 401, an IECQ integrated circuit chip 403, an ICC integrated circuit chip 405, a custom integrated circuit chip 407, a codec filter 409, a DDS transceiver 411, a subscriber loop interface circuit (SLIC) 413, data transformers 415, and other elements. VF Plus DD RT is coupled to the digital subscriber line 204, and is coupled to the lines 217 for the 4-wire DDS signals. The VF Plus DD RT is also coupled to tip (T) and ring (R) lines 213.

The VF Plus DD RT may be placed at the customer premises, which is often a business or the like using both the 4-wire digital data service and analog voice channel. The VF Plus DD RT easily installs at the customer premises with use of simple line tools and the like. Details of signal flow through the system elements will be first described with reference to the incoming signal from the telephone company location (or central office).

Incoming 160 kbps 2B1Q signals from the digital subscriber line 204 enter the DSL transformer 401. The DSL transformer and adjacent resistive elements (not shown) isolate, condition, and impedance match the 2B1Q signal from the digital subscriber line for use at the IECQ integrated circuit chip 403. The 2B1Q signals enter the IECQ integrated circuit chip from the DSL transformer 401 via line 421. The IECQ integrated circuit chip converts the 160 kbps 2B1Q signal into a unidirectional binary signal at 256 kbps for transmission through line 423 to the ICC integrated circuit chip. The unidirectional binary signal includes user data and control data. The IECQ integrated circuit chip uses 512 kbps and 8 kbps clocks from the custom integrated circuit chip via line 430 for clocking the signal conversions. (It should be noted that the 512 kbps and 8 kpbs clocks are synchronized from the incoming 160 kbps 2B1Q signal at the digital subscriber line.) The ICC integrated circuit chip converts the 256 kbps binary signal from the IECQ integrated circuit into a 512 kbps bi-directional "ping-ponged" bit stream for use at the custom integrated circuit chip via line 427.

The custom integrated circuit chip in the VF Plus DD RT operates in a similar manner as the VF Plus DD COT. The custom integrated circuit chip provides clocking and data handling features. In the specific embodiment, the custom integrated circuit is a Xilinx 3000 Series Programmable Gate Array, but it will be recognized by one of ordinary skill in the art that other integrated circuit devices may also be used. Appendix III provides a schematic representation (Copyright, Unpublished Work, Raychem Corporation) for the Xilinx 3000 Series Programmable Gate Array for the VF Plus DD RT discussed herein.

At the VF Plus DD RT, the custom integrated circuit chip phase locks its internal clocks to the incoming 160 kbps 2B1Q signal and provides for selected clock frequencies. For example, the custom integrated circuit chip provides a sub-rate transmit clock (Clk) for the 4-wire DDS signal to the DDS transceiver via line 439. The custom integrated circuit chip also provides signals at 64 kbps, 512 kbps, and 15.360 Mbps for use in itself, the ICC integrated circuit chip, the IECQ integrated circuit chip, and other integrated circuits. The custom integrated circuit chip relies upon a dual PLL arrangement to provide its clocking features.

Besides clocking features, the custom integrated circuit chip transmits and receives the 512 kbps bi-directional "ping-ponged" signal to and from the ICC integrated circuit chip, repeatedly and simultaneously. The 8-bit words contained therein are demultiplexed into four 64 kbps signals, representing the two user data signals (one signal representing the 4-wire DDS signal and the other signal representing the analog signal), the C & I signal, and the monitor signal. The two user data signals each at a signal rate of 64 kbps convert into data signals each having the D+ and D− component in binary TTL form.

The user data signal at 64 kbps representing the analog signal enters the codec filter via lines 433. The codec filter relies upon the 64 kbps clock signal (Clk) from the custom integrated circuit chip via line 437 to convert the binary TTL signal (D+ and D−) into the analog signal. The analog signal from the codec filter enters the subscriber loop interface circuit (SLIC) via lines 441. The subscriber loop interface circuit conditions the analog telephone signal for use at a telephone and the like.

The user data signal at 64 kbps representing the 4-wire DDS signal enters the DDS transceiver (DDS-B) via lines 435. The DDS transceiver uses the clock signal (Clk) from the custom integrated circuit chip via line 439 to convert the binary TTL data (D+ and D−) into the 4-wire DDS signal. In particular, the custom integrated circuit chip generates a sub-rate clock signal used by the transceiver to clock the data out through the data transformer. The 4-wire DDS signal from the DDS transceiver 411 enters the data transformer via lines 443. The data transformer and adjacent resistive elements (not shown) isolate, condition, and impedance match the 4-wire DDS signal for the DSU/CSU via lines 449. The DSU/CSU converts the 4-wire DDS signals into signals such as RS-232C, V.35, or the like compatible for use at the data terminal equipment.

Outgoing signals are processed through the VF Plus DD RT in a similar but reverse method as the incoming signals. In particular, the 4-wire DDS signal originates at the DSU/CSU and enters the data transformer 415 via lines 451. The data transformer and adjacent resistive elements (not shown) isolate, impedance match, and condition the 4-wire DDS signal for the DDS transceiver 441 via lines 445. The DDS transceiver 411 converts the 4-wire DDS signal from the data transformer 415 into a binary TTL signal D+, and its inversion D− for transmission to the custom integrated circuit via lines 435.

The outgoing analog signal originates at the telephone via lines 213 and enters the subscriber loop interface circuit 413. The subscriber loop interface circuit conditions the analog signal from the telephone for the codec filter 409 via lines 441. The codec filter converts the analog signal from the subscriber loop interface circuit into a digital signal with D+ and D− components. The D+ and the D− signals enter the custom integrated circuit via clock (Clk) at line 437 and lines 433.

The custom integrated circuit chip via clocking signals from line 429 converts the D+ and the D− signals from the codec filter 409 and the data transceiver 411 into two 64 kbps signals that define two user data signals. The C & I signal and the monitor signal each at 64 kbps are multiplexed into the two user data signals to provide the 512 kbps "ping-ponged" bi-directional bit stream from the custom integrated circuit to the ICC integrated circuit via line 427. The ICC integrated circuit chip converts the user data and selected control data at 512 kbps into two unidirectional 256 kbps binary signals representing the incoming and the outgoing signals. The outgoing 256 kbps signal from the ICC integrated circuit chip enters the IECQ integrated circuit via line 425. The IECQ integrated circuit chip converts the 256 kbps binary signal into a quaternary signal in the 2B1Q format at a transmission rate of 160 kbps The 2B1Q formatted outgoing signal from the IECQ integrated circuit chip enters the DSL transformer 401 via line 421. The DSL transformer 401 and adjacent resistive elements (not shown) isolate, impedance match, and condition the outgoing 2B1Q formatted signal for transmission over the digital subscriber line 204 which is a single twisted pair telephone line. The 2B1Q signal is transmitted over the single twisted pair for use at a central office location. Appendix IV provides a schematic representation of FIG. 4 (Copyright, Unpublished Work, Raychem Corporation) for the VF Plus DD RT discussed above.

Without in any way limiting the scope of the invention, Table 1 provides a list of commercially available components which are useful in the operation of the VF Plus DD RT and VF Plus DD COT according to the above embodiments. It will be apparent to those of ordinary skill in the art that the components listed in Table 1 are merely representative of those which may be used in association with the inventions herein and are provided for the purpose of facilitating assembly of an apparatus in accord with the invention. A wide variety of components readily known and available to those of ordinary skill in the art could readily be substituted or functionality could be combined or even separated. It should be noted that CMOS-based integrated circuits have been utilized where possible so as to reduce power consumption of the RT in particular.

TABLE 1

VF Plus DD RT Components

| Component | Part Numbers |
| --- | --- |
| DSL Xfmr | Standard 2B1Q Transformer |
| IECQ | Siemens 2091 |
| ICC | Siemens 2070 |
| Custom Chip | Xilinx 3000 Series |
| Transceiver | Level One LXT 400 |
| Codec Filter | Fujitsu MB6021 |
| Data Transformer | TMC 5730 or Midcom 671-6390 |
| Hybrid Transformer | Standard Voice Frequency Hybrid Transformer |
| SLIC | Erickson PBL 3764 |
| Microprocessor | Intel 87C51FA |

II. System Software

Appendix V provides a program listing (Copyright, Unpublished Work, Raychem Corporation) for software for the VF Plus DD COT discussed above. The code is adapted for and has been used on an Intel 87C51FA family of processors, although it will be apparent that the invention could be applied to a wide variety of such processor. Appendix VI provides a similar listing (Copyright, Unpublished Work, Raychem Corporation) for the code used for the microprocessor in the VF Plus DD RT discussed above. Again, however, a wide variety of microprocessors could be used herein without departing from the scope of the invention.

III. Power Down Features

Figure 5:
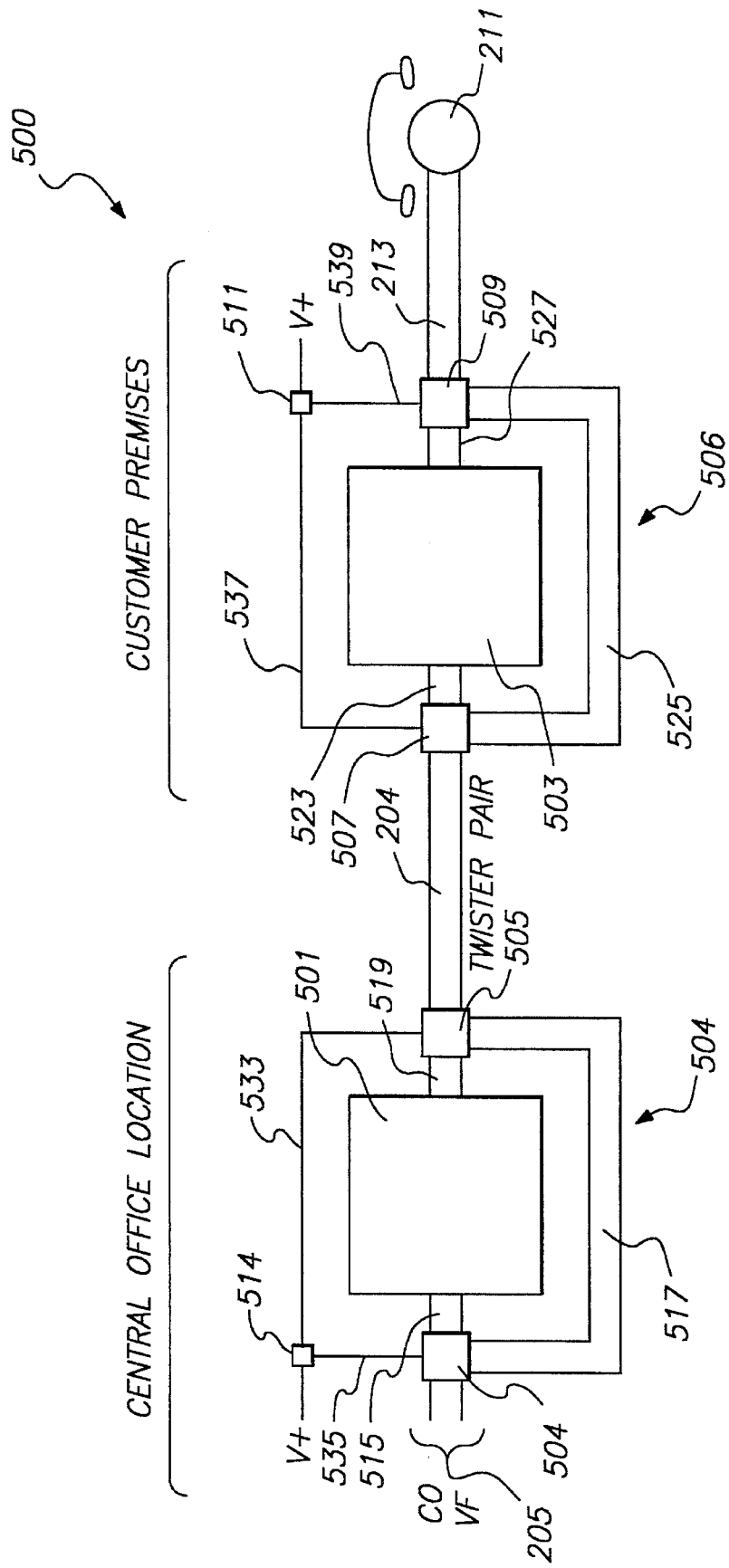
FIG. 5 is a simplified flow diagram for an analog telephone service bypass service according to the present invention.

The system described above also includes bypass circuits to change the multiplexed digital use of the single twisted pair to the transmission of plain old telephone services during power failure. FIG. 5 is a simplified block diagram of the bypass circuits according to the present invention. The block diagram includes VF Plus DD COT normal mode circuit elements 501 and VF Plus DD RT normal mode circuit elements 503. The normal mode circuit elements are similar to the elements in the VF Plus DD RT and the VF Plus DD COT described in the aforementioned embodiments. During normal operation the bypass circuits allow the incoming analog telephone signal 205 to operate with the normal mode circuit elements of the VF Plus DD COT via lines 515, 519 and the VF Plus DD RT via lines 523, 527.

Power failure at the VF Plus DD COT bypass circuit 504 bypasses the incoming analog telephone signal from line 205 around the normal mode VF Plus DD COT circuit elements 501 to the outgoing twisted pair telephone line 204. In particular, the voltage V+ at the voltage sensor 514 goes to zero, and the voltage sensor 514 sends control signals via lines 533 and 535 to switches 504 and 505, respectively, to bypass the incoming analog telephone signals to lines 517. The switches isolate the bypassed analog telephone signal from the normal mode circuit elements 501.

The VF Plus DD RT bypass circuit 506 operates in a similar manner as the VF Plus DD COT bypass circuit as described above. Since VF Plus DD RT receives its power from the twisted pair 204 during normal mode operation, power failure at the VF Plus DD COT also results in power failure at the VF Plus DD RT. During power failure, the incoming analog telephone signal from the twisted pair telephone line 204 bypasses the normal mode circuit elements 503 to a telephone 211. Voltage V+ at the voltage sensor 511 goes to zero during power failure, and control signals via lines 537 and 539 enter switches 507 and 539, respectively. The switches bypass the incoming analog telephone signal from the twisted pair 204 via lines 525 to the telephone 211. The switches also isolate the normal mode circuit elements 503 from the bypassed analog telephone signals. The VF Plus DD RT and the VF Plus DD COT bypass circuits allow the user to rely upon plain old telephone services during power failure. Appendices II and IV (Copyright, Unpublished Work, Raychem Corporation) provide a schematic representation the bypass circuits according to the present invention. Alternatively, an inability to sustain a linked condition between the normal mode VF Plus DD RT circuit 503 and the normal mode VF DD COT circuit 501 results in the bypass circuits redirecting the analog phone signal in a similar manner as the power failure. One of ordinary skill in the art would easily recognize, the bypass circuits may be described as a variety of other types of circuits and the like and bypass the analog phone signal for a variety of other reasons.

While the above is a full description of the specific embodiments, various modifications, alternative constructions, and equivalents may be used. For example, while the description above is in terms of converting dual 4-wire DDS for use on a single twisted pair, it would be possible to implement the present invention with other configurations.

Therefore, the above description and illustrations should not be taken as limiting the scope of the present invention which is defined by the appended claims.

What is claimed is:

1. A method of transferring signals from a voice channel and a digital data service channel from a telephone company location to a customer premises, said method comprising steps of:

providing an analog telephone signal and a 4-wire DDS signal at a telephone company location, said 4-wire DDS signal is a bipolar signal;

converting said analog telephone signal into a first binary signal, converting said 4-wire DDS signal into a second binary signal, and combining said first binary signal and said second binary signal to a higher rate binary signal;

converting said higher rate binary signal into a digital signal; and transferring said digital signal to a customer premises over a single twisted pair telephone line.

2. The method of claim 1 wherein said digital signal is selected from a group consisting of a 2B1Q format and a 4B3T format.

3. The method of claim 1 wherein said 4-wire DDS signals is a signalling rate selected from a group consisting of 2.4 kbps, 4.8 kbps, 9.6 kbps, 19.2 kbps, 56 kbps, and 64 kbps.

4. The method of claim 1 wherein said analog signal is a voice signal.

5. The method of claim 1 wherein said higher rate binary signal is a 256 kbps signal and said digital signal is a 160 kbps signal.

6. The method of claim 1 wherein said 4-wire DDS signals is selected from a group consisting of a video signal, a data signal, and a voice signal.

7. The method of claim 1 wherein said method occurs in a detachable Central Office Terminal (COT) unit.

8. The method of claim 1 wherein said single twisted pair is an 18 kilo-feet span using mixed gauge cable.

9. The method of claim 1 further comprising steps of:

bypassing said method steps during a power failure; and providing said analog telephone signal; and transferring said analog telephone signal to said customer premises over said single twisted pair telephone line.

10. The method of claim 1 further comprising a method for receiving said digital signals from said telephone company location, said method comprising:

providing said digital signal at said customer premises;

converting said digital signal to said higher rate binary signal;

separating said first binary signal and said second binary signal from said higher rate binary signal; and converting said first binary signal into said analog telephone signal and converting said second binary signal into said 4-wire DDS signal.

11. Apparatus for transferring signals from a voice channel and a digital data service channel from a telephone company location to a customer premises, said apparatus comprising:

an analog telephone signal source and a 4-wire DDS signal source at a telephone company location; and a central office circuit converting said analog telephone signal into a first binary signal, converting said 4-wire DDS signal into a second binary signal, combining said first binary signal and said second binary signal to a higher rate binary signal, converting said higher rate binary signal into a digital signal format, and transferring said digital signal to a customer premises over a single twisted pair telephone line.

12. The apparatus of claim 11 wherein said digital signal format is selected from a group consisting of a 2B1Q format and a 4B3T format.

13. The apparatus of claim 11 wherein said 4-wire DDS signal is a signalling rate selected from a group consisting of 2.4 kbps, 4.8 kbps, 9.6 kbps, 19.2 kbps, 56 kbps, and 64 kbps.

14. The apparatus of claim 11 wherein said analog signal is a voice signal.

15. The apparatus of claim 11 wherein said higher rate binary signal is a 256 kbps signal and said digital signal is a 160 kbps signal.

16. The apparatus of claim 11 wherein said 4-wire DDS signal is selected from a group consisting of a video signal, a data signal, and a voice signal.

17. The apparatus of claim 11 wherein said apparatus is a detachable Remote Terminal (RT) unit.

18. The apparatus of claim 11 wherein said single twisted pair is an 18 kilo-feet span using mixed gauge cable.

19. The apparatus of claim 11 further comprising a bypass circuit for bypassing said analog telephone signal source to said customer premises.

20. The apparatus of claim 11 further comprising:

a 4-wire digital signal source and an analog signal source at said customer premises;

a remote terminal circuit converting said digital signal to said higher rate binary signal, separating said first binary signal and said second binary signal from said higher rate binary signal, converting said first binary signal into said analog telephone signal, and converting said second binary signal into said 4-wire DDS signal.

21. A method of converting the use of a single twisted pair line into a multiplexed digital use comprising an analog channel and a 4-wire DDS channel, said method comprising the steps:

installing an office terminal at a telephone company location, said office terminal comprising a central office circuit adapted to convert an analog telephone signal into a first binary signal, adapted to convert a 4-wire DDS signal into a second binary signal, adapted to combine said first binary signal and said second binary signal to a higher rate binary signal, adapted to convert said higher rate binary signal into a digital signal, and adapted to transfer said digital signal to a customer premises over a single twisted pair telephone line; and installing a remote terminal at a customer premises, said remote terminal comprising a remote terminal circuit adapted to convert said digital signal to said higher rate binary signal, adapted to separate said first binary signal and said second binary signal from said higher rate binary signal, adapted to convert said first binary signal into said analog telephone signal, and adapted to convert said second binary signal into said 4-wire DDS signal for use at said customer premises.

\* \* \* \* \*